(12) United States Patent
Knorr et al.

(10) Patent No.: US 8,207,445 B2
(45) Date of Patent: Jun. 26, 2012

(54) SEALING BODY FOR A CABLE SLEEVE

(75) Inventors: Jens Knorr, Werdohl (DE); Andreas M. Eichstädt, Hemer (DE)

(73) Assignee: CCS Technology, Inc., Wilmington, DE (US)

( * ) Notice: Subject to any disclaimer, the term of this patent is extended or adjusted under 35 U.S.C. 154(b) by 370 days.

(21) Appl. No.: 12/249,179

(22) Filed: Oct. 10, 2008

(65) Prior Publication Data
US 2009/0057008 A1    Mar. 5, 2009

Related U.S. Application Data

(63) Continuation of application No. PCT/EP2007/001841, filed on Mar. 3, 2007.

(30) Foreign Application Priority Data

Apr. 11, 2006  (DE) ..................... 20 2006 006 020 U

(51) Int. Cl.
  *H02G 15/02*  (2006.01)
(52) U.S. Cl. ....................... 174/77 R; 174/93
(58) Field of Classification Search ............... 174/77 R, 174/93
  See application file for complete search history.

(56) References Cited

U.S. PATENT DOCUMENTS

| | | | |
|---|---|---|---|
| 4,818,310 A | 4/1989 | McNeal ........................... 156/48 |
| 5,588,856 A | 12/1996 | Collins et al. ................. 439/204 |
| 5,775,702 A | 7/1998 | Laeremans et al. ........... 277/314 |
| 5,789,707 A | 8/1998 | Damm et al. .................... 174/65 |
| 5,848,814 A * | 12/1998 | Nadasky et al. .............. 285/342 |
| 5,931,474 A * | 8/1999 | Chang et al. .................. 277/316 |
| 6,107,574 A * | 8/2000 | Chang et al. ................ 174/77 R |
| 2004/0256138 A1 | 12/2004 | Grubish et al. .................. 174/93 |
| 2005/0167431 A1 | 8/2005 | Stora .......................... 220/359.1 |

FOREIGN PATENT DOCUMENTS

| | | |
|---|---|---|
| DE | 69121576 T2 | 2/1997 |
| DE | 69600894 T2 | 5/1999 |
| EP | 0442941 B1 | 1/1995 |
| EP | 0646294 B1 | 11/1996 |
| EP | 1238451 B1 | 5/2003 |
| FR | 2820555 | 8/2002 |
| JP | 11-98671 | 4/1999 |
| JP | 11-313427 | 11/1999 |
| WO | WO93/26069 | 12/1993 |
| WO | WO96/09670 | 3/1996 |
| WO | WO96/29760 | 9/1996 |
| WO | WO97/42693 | 11/1997 |
| WO | WO 00/46895 | 8/2000 |
| WO | WO 02/063736 | 8/2002 |

\* cited by examiner

*Primary Examiner* — Chau N Nguyen

(74) *Attorney, Agent, or Firm* — Christopher Paul Lewallen

(57) ABSTRACT

A sealing body for a cable sleeve, in which a compensation element is embodied as an elastomer element that is inlaid or embedded in the gel-like sealing element is disclosed. The compensation element, by means of which the alterations in the material behavior of the gel-like sealing element which occur in use can be compensated, is embodied as an elastomer element inlaid in the gel-like sealing element.

9 Claims, 2 Drawing Sheets

SEALING BODY FOR A CABLE SLEEVE

CROSS-REFERENCE TO RELATED APPLICATIONS

This application is a continuation of International Application No. PCT/EP2007/001841, filed Mar. 3, 2007, which claims priority to German Application No. DE202006006020.0, filed Apr. 11, 2006, both applications being incorporated herein by reference.

BACKGROUND

1. Technical Field

The invention relates to optical fiber devices, and more particularly to a sealing body for a cable sleeve for a fiber optic cable.

2. Technical Background

Cable sleeves for the structured deposition or handling of optical fibers in fiber-optic cables are used in fiber-optic cable networks for protecting spliced connections at connecting points of two fiber-optic cables and for protecting fiber-optic cables at branch-off points or at dividing points of fiber-optic cables. In doing so, the cable sleeve must guarantee the continuity of the fiber-optic cables as if the fiber-optic cables were not interrupted. Great importance is attached to the structured deposition and gentle handling of the optical fibers so that the transmission characteristics of the optical fibers are not negatively affected.

A cable sleeve is disclosed in EP 0 646 294 B1 which has a covering body and a sealing body that can be fed into an opening of the covering body, the sealing body comprising a gel-like sealing material, which is arranged between two dimensionally stable plates. The sealing body can be slid in and out in a hollow cavity in the axial direction with respect to the covering body in order to compensate for pressure differences between an internal pressure and an external pressure of the cable sleeve. In doing so, the sealing body comes to rest against different stops depending on this pressure difference.

EP 0 442 941 B1 likewise discloses a cable sleeve with a covering body and a sealing body, which is fed into an opening in the covering body. The sealing body shown in FIGS. 28A, 28B of EP 0 442 941 B1 comprises a gel-like sealing element, which is bordered on two opposite sides by a dimensionally stable end piece in each case. Through the gel-like sealing element there extends a pressure element, which is designed in the form of an adjusting screw, by means of which a force can be exerted on the dimensionally stable end pieces in order to compress the gel-like sealing element and thus to press said sealing element against a cable, which is placed in a cable entry opening of the sealing element, while sealing said sealing element. In order to maintain the sealing function of the gel-like sealing element throughout the whole period of use of the cable sleeve, a compensation element, which is designed in the form of a spring and which is able to compensate for alterations in the material behavior of the gel-like sealing element caused by temperature fluctuations for example, is compressed by the pressure element. If, for example, the gel-like sealing element shrinks at low temperatures more than the remaining components of the sealing body, then the sealing action of the gel-like sealing element can however be maintained in the area of the cable entry opening, as the compensation element, which is designed in the form of a spring, keeps the gel-like sealing element under a sufficient compression force.

SUMMARY OF THE DETAILED DESCRIPTION

The embodiments disclosed in the detailed description include a new kind of sealing body for a cable sleeve, in which a compensation element is embodied as an elastomer element that is inlaid or embedded in the gel-like sealing element. In this regard, the compensation element, by means of which the alterations in the material behavior of the gel-like sealing element which occur in use can be compensated, is embodied as an elastomer element inlaid in the gel-like sealing element.

Accordingly, the compensation element is arranged adjacent to a cable entry opening made in the gel-like sealing element. The compensation element preferably being designed in the form of a cylinder, and a longitudinal center axis of the compensation element extending roughly perpendicular to a longitudinal central axis of a cable entry opening made in the gel-like sealing element.

BRIEF DESCRIPTION OF THE FIGURES

Exemplary embodiments of the invention, without being restricted thereto, are described in more detail with reference to the drawing. In the drawing.

DETAILED DESCRIPTION

Figure 1:
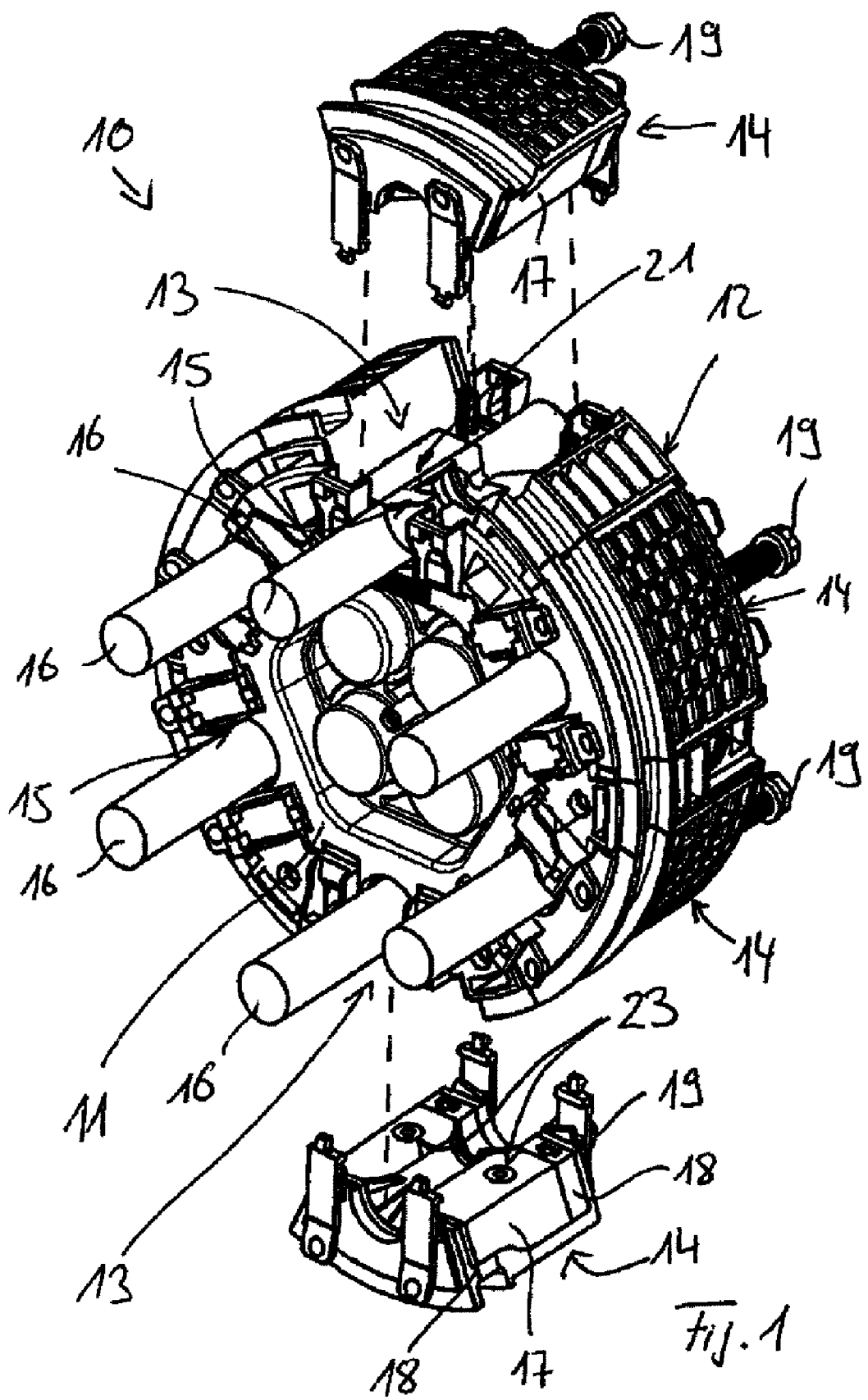
FIG. 1 shows a sealing body in a partial perspective exploded view.

FIG. 1 shows an exemplary embodiment of a sealing body 10 according to the invention for a cable sleeve, wherein in the exemplary embodiment shown the sealing body 10 comprises a central sealing body segment 11 and a cylinder-segment-like sealing body segment 14, which can be fed into recesses 13 made in an external sleeve surface 12 of the central sealing body segment 11.

In the exemplary embodiment of FIG. 1 shown, a total of six recesses 13 are made in the central sealing body segment 11, whereby a cylinder-segment-like sealing body segment 14 can be fed into each of the recesses 13. According to FIG. 1 the cylinder-segment-like sealing body segments 14 can be fed into the recesses 13 of the sealing body segment 11 in a radial direction thereof.

Figure 2:
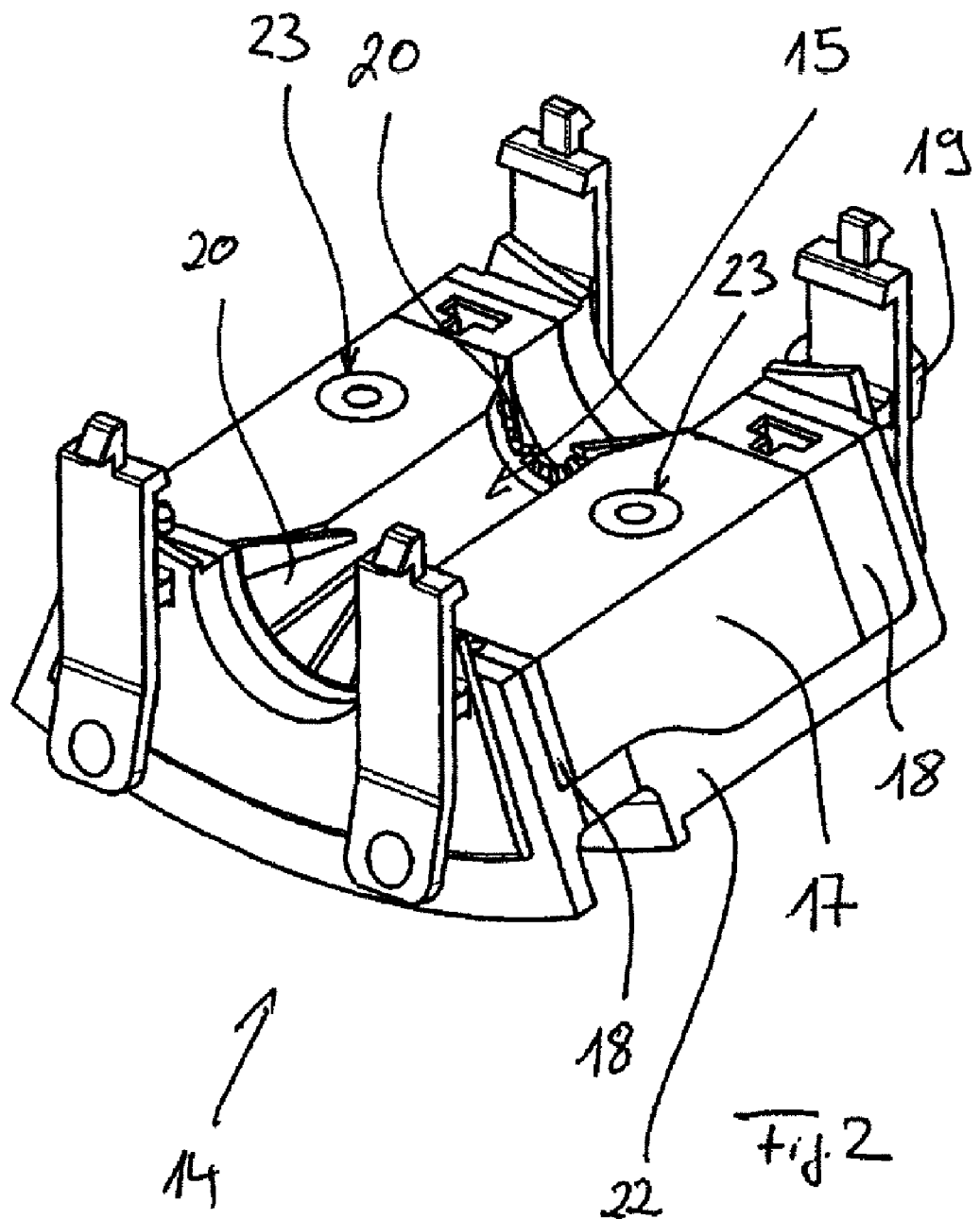
FIG. 2 shows a sealing body segment of the sealing body of FIG. 1 shown by itself in perspective view.

According to FIGS. 1 and 2 a cable entry opening 15 for sealing a cable 16 is embodied in the area of each recess 13 and therefore of each cylinder-segment-like sealing body segment 14. Accordingly, a cable 16 can be individually sealed in the corresponding cable entry opening 15 in the case of each cylinder-segment-like sealing body segment 14.

In the exemplary embodiment shown each cylinder-segment-like sealing body segment 14 (see in particular FIG. 2) has a gel-like sealing element 17, which is bordered on two opposite sides by a dimensionally stable end piece in each case embodied as a spring plate 18. In the exemplary embodiment shown a force can be exerted on one of the two end pieces 18 by means of a pressure element 19 in order to compress the gel-like sealing element 17 of the sealing body segment 14. Here, the gel-like sealing element 17 is then pressed against a cable 16 laid in the corresponding cable entry opening 15 in order to seal said cable in the area of the cable entry opening 15. At the same time, spring elements 20 arranged on the spring plates 18 center the cable 16 and prevent the gel-like sealing element 17 from being pushed outwards when compressed.

Each gel-like sealing element 17 of a cylinder-segment-like sealing body segment 14 acts together with a gel-like sealing body element 21 arranged in the appropriate recess 13 of the central sealing body segment 11.

According to FIG. 2 the gel-like sealing element 17 and the dimensionally stable end pieces of a cylinder-segment-like sealing body segment 14, which are embodied as spring plates 18, are arranged in a housing 22 of the appropriate cylinder-segment-like sealing body segment 14. When the gel-like sealing element 17 is compressed with the help of the pressure element 19, the dimensionally stable end piece 18, with which the pressure element 19 engages, is pushed against the other dimensionally stable end piece 18, as a result of which the distance between the two dimensionally stable end pieces 18 therefore reduces and ultimately the gel-like sealing element 17 is compressed. This effects a sealing of a cable 16 laid in a cable entry opening 15.

While the sealing body 10, or a cable sleeve which includes the sealing body 10, is in use, the material characteristics of the gel-like sealing element 17 of each cylinder-segment-like sealing body segment 14 can alter. In particular, it must be stated that at low temperatures gel-like sealing elements are subject to greater shrinkage than the remaining components of sealing body segments so that under certain circumstances adequate sealing of a cable 16 laid in a cable entry opening 15 can no longer be maintained. In order to compensate for such alterations in the material behavior caused by temperature fluctuations, for example, at least one compensation element 23 is associated with said sealing elements, which maintains the sealing action of the gel-like sealing elements 17. In the sense of the present invention the or each compensation element 23 is embodied as an elastomer element, which is inlaid in the respective gel-like sealing element 17 of the respective sealing body segment 14.

In the exemplary embodiment shown in FIG. 2 two compensation elements 23 are inlaid or embedded in the gel-like sealing element 17 of each cylinder-segment-like sealing body segment 14, said compensation elements being positioned adjacent to the cable entry opening 15 of the gel-like sealing element 17.

According to FIG. 2, at the same time the two compensation elements 23 are arranged approximately centrally between the two dimensionally stable end pieces, which are embodied as spring plates 18.

It must be pointed out here that the number and the specific arrangement of the compensation elements 23 shown in FIG. 2 are purely exemplary. Therefore, under certain circumstances, it can be sufficient to arrange only a single compensation element 23 at one side of a cable entry opening 15. Furthermore, more than two compensation elements 23 can also be inlaid or embedded in the gel-like sealing element 17, these then being preferably arranged behind one another on both sides of the corresponding cable entry opening 15 when viewed in the longitudinal direction of the cable entry opening 15.

In the exemplary embodiment shown in FIG. 2 the compensation elements 23 are designed in the form of a cylinder, a longitudinal central axis of the cylinder-like compensation elements 23 extending approximately perpendicular to the longitudinal central axis of the cable entry opening 15, but without intersecting the cable entry opening 15.

The compensation elements 23, which are embodied as elastomer elements, are subject to virtually no shrinkage even at low temperatures well below freezing, whereby elastic characteristics of said compensation elements remain virtually unaltered. Thus, if the gel-like sealing element 17 is subject to shrinkage at low temperatures, then the compensation elements 23, which are embodied as elastomer elements, exert a pressure on the gel-like sealing element 17, by means of which the sealing of a cable in the area of the cable entry opening 15 and therefore the sealing action of the gel-like sealing element 17 can be maintained.

Preferably, the compensation elements 23 shown in FIG. 2 are embodied as a thermoplastic elastomer, referred to as TPE for short. In particular, thermoplastic polyurethane, TPU or PUR for short, is suitable for the thermoplastic elastomer. Likewise, it is possible to manufacture the compensation elements 23 from a terpolymer elastomer, for example from ethylene propylene rubber (ethylene propylene monomer), referred to as EPM for short, or from ethylene propylene diene monomer, referred to as EPDM for short. It is also possible to embody the compensation elements 23 from a silicone elastomer.

In the sense of the present invention compensation elements of this kind can also be associated with the gel-like sealing elements 21 of the central sealing body segment 11. Although the invention is preferably used with the sealing body 10 shown in FIG. 1, said invention can also be used with any other sealing body, which has at least one gel-like sealing element.

What is claimed is:

1. A sealing body for a cable sleeve comprising:
    at least one sealing body segment, wherein the at least one sealing body segment comprises a gel-like sealing element, and
    a compensation element embodied as an elastomer element that is inlaid or embedded in the gel-like sealing element, wherein alterations in the material behavior of the gel-like sealing element caused by temperature fluctuations can be compensated by the compensation element for maintaining the sealing action of the gel-like sealing element,
    wherein the compensation element is designed in the form of a cylinder, with a longitudinal center axis of the compensation element extending perpendicular to a longitudinal central axis of a cable entry opening made in the gel-like sealing element.

2. The sealing body of claim 1, wherein the compensation element is formed from a thermoplastic elastomer (TPE).

3. The sealing body of claim 2, wherein the compensation element is formed from a thermoplastic polyurethane (TPU).

4. The sealing body of claim 1, wherein the compensation element is formed from a terpolymer elastomer.

5. The sealing body of claim 4, wherein the compensation element is formed from ethylene propylene rubber (EPM) or from ethylene propylene diene monomer (EPDM).

6. The sealing body of claim 1, wherein the compensation element is formed from a silicone elastomer.

7. The sealing body of claim 1, wherein the compensation element is arranged adjacent to the cable entry opening made in the gel-like sealing element.

8. The sealing body of claim 1, wherein at least one compensation element is arranged on either side of the cable entry opening made in the gel-like sealing element.

9. The sealing body of claim 1, wherein the gel-like sealing element is bordered on two opposite sides by a dimensionally stable end piece, and wherein the cable entry opening extends through the gel-like sealing element and the dimensionally stable end pieces, and wherein the compensation element is inlaid in the gel-like sealing element approximately centrally between the dimensionally stable end pieces adjacent to the cable entry opening.

* * * * *